Patented Jan. 16, 1951

2,538,737

UNITED STATES PATENT OFFICE 2,538,737

FILM-FORMING LATEX OF UNPLASTICIZED TERNARY VINYLIDENE CHLORIDE COPOLYMER

George William Stanton, Contra Costa County, Calif., and Charles Everett Lowry, Midland, Mich., assignors to The Dow Chemical Company, Midland, Mich., a corporation of Delaware No Drawing. Application May 27, 1948, Serial No. 29,666

1 Claim. (Cl. 260—29.6)

This inventinon relates to a latex-like dispersion formed by the polymerization of particular proportions of each of three polymerizable monomers in an aqueous emulsion, which is capable of depositing flexible and elastic continuous films having high resistance to moisture vapor transmission even though containing no plasticizer and having been dried at room temperature.

It is well known that the polymer of vinylidene chloride and its copolymers in which vinylidene chloride predominates, and usually those in which vinylidene chloride exceeds 75 to 80 per cent, are highly crystalline, as shown by their X-ray diffraction patterns. It is also known that these crystalline copolymers can be fused to convert them to a non-crystalline condition which persists temporarily when the fused mass is chilled or "supercooled," and that, while in the supercooled condition, they may be cold-stretched to effect recrystallization and orientation of the submicroscopic crystallites. Advantage is taken of this property to make extruded filaments and films. In the form of such oriented films, the highly crystalline copolymers are noted for their extreme imperviousness to water vapor. In order to prepare such films, however, it is necessary to add plasticizers and heat stabilizers to the copolymer, to facilitate extrusion without decomposition. The resulting stretched and crystalline films exhibit such a high degree of crystal packing that they have little capacity for plasticizer, and it is not uncommon for the plasticizer to exude or "bleed" from the films. Thus, while the extruded and stretched crystalline vinylidene chloride films have many properties making them desirable for wrapping foods, the character of the plasticizer often prevents the film from being acceptable for such use. Further, the equipment required for extruding, supercooling and stretching such films is not readily adapted to the production at will, of films of various dimensions. Because of the flexibility of the process of producing films from liquid media, it would be highly advantageous to be able to obtain a flexible and elastic crystalline vinylidene chloride film, free from plasticizers, and having high resistance to transmission of water vapor without need for thermal processes or for extrusion equipment. It would be especially desirable to be able to produce such a film by simple deposition from an aqueous latex-like dispersion.

It is accordingly the principal object of the present invention to provide a latex-like dispersion of a crystalline vinylidene chloride copolymer, capable of depositing flexible and elastic films and coatings which are continuous and moisture-impervious when dried at room temperature. A particular object is to provide such a latex whose deposited and dried films are as resistant to the passage of water vapor as are films of crystalline vinylidene chloride copolymers formed by the usual thermal process comprising fusion, supercooling and cold-stretching. Other and related objects may appear hereinafter.

According to the present invention, the foregoing desired results may be obtained through the use of a latex-like dispersion of one of a small group of ternary copolymers of vinylidene chloride, acrylonitrile and ethyl acrylate. The only ternary copolymers of these three polymerizable compounds whose latices deposit continuous films are those containing from 88 to 95 per cent vinylidene chloride, from 1 to 6 per cent acrylonitrile and from 1 to 11 per cent ethyl acrylate, but many of these copolymers are not flexible or elastic, and some of those which are flexible do not form moisture-impervious films and coatings comparable with the films prepared by the more expensive extrusion process. There are a few copolymers within this group, however, which possess that desirable characteristic. These are defined by the limits of 89 to 92 per cent vinylidene chloride, 2 to 4 per cent acrylonitrile and 4 to 9 per cent ethyl acrylate. The best of these copolymers are those in which, if the acrylonitrile concentration is 3 per cent, the vinylidene chloride is not less than 90 per cent, and, if the acrylonitrile concentration is 4 per cent, the vinylidene chloride is not less than 91 per cent—the balance in each case being ethyl acrylate. The copolymer having the desired properties to the greatest extent is that of 90 per cent vinylidene chloride, 2.5 to 3 per cent acrylonitrile and 7.5 to 7 per cent ethyl acrylate. The total of the three named copolymerized constituents is always 100 per cent.

The latex-like dispersions having the desired properties are obtained by polymerizing together the three named monomers in the above-defined range of proportions, in an aqueous medium, in the presence of a polymerization catalyst, at a pH between 1.5 and 6.5, and in the presence of an emulsifying agent. The operative ratios of monomers (disperse phase) to water (continuous phase) to produce film-forming latices, are from 45 to 60 per cent monomers and correspondingly from 55 to 40 per cent water.

Any of the usual peroxidic catalysts may be used, including hydrogen peroxide, benzoyl peroxide, sodium perborate, potassium persulfate, and the like. Because it is completely miscible with water and leaves no non-volatile peroxidic residue in the deposited film, hydrogen peroxide is preferred. From 0.25 to 0.5 per cent of peroxide, based on the combined weights of the three monomers, is usually sufficient. To accelerate the polymerization reaction, there may also be added small amounts of a water-soluble iron salt, such as ferric nitrate, as described, for example, by Britton and LeFevre in U. S. Patent 2,333,633. The required acidic condition may be obtained by introducing small amounts of acids to the aqueous dispersion of the monomers, and may be maintained by means of buffering agents. The emulsifier employed may be one of the soluble salts of an aryl sulfonic acid or of a long chain alkyl sulfate, or other anionic emulsifier capable of operating in an acid medium. The emulsifier is usually used in an amount of about 1 to 3 per cent of the weight of the water-immiscible materials present. After polymerization is complete, it is desirable to neutralize the emulsion or to make it slightly alkaline (pH 7 to 8) if it may be used to coat paper which might be injured by an acid coating.

The new latex-like dispersion may be spread upon a smooth, non-porous surface and dried at or near room temperature, and the so-formed film may be stripped from the surface for use as a film, or the latex may be spread as a coating on a porous surface from which it cannot be stripped after drying. In either case, the deposited film is continuous, flexible, elastic, and as highly impervious to water vapor as the conventional extruded and stretched crystalline films of vinylidene chloride copolymers. It contains no plasticizer which might exude from or contribute odor to the film, and may be used safely to wrap foods. The deposited films and coatings are resistant to oils and greases and may be used, either as free film or as coated paper, to wrap and protect fatty foods without tainting the food and without exudation of the fatty material from the package.

The following examples illustrate the practice of the invention:

EXAMPLE 1

A number of copolymers of vinylidene chloride, acrylonitrile and ethyl acrylate was prepared under uniform conditions of treatment. Sixty parts by weight of the monomer mixture were added to 40 parts by weight of water, to which had been added 0.6 part by weight of 30 per cent hydrogen peroxide, 0.0036 part by weight of ferric nitrate nonahydrate (to provide 5 parts per million of iron) and 1.8 parts by weight of methylene di-(naphthalene sodium sulfonate) as emulsifier. The mixture was shaken until emulsified, and was kept at a constant temperature of 40° C. until polymerization was substantially complete, which usually required about 20 to 24 hours. The film-forming characteristics of the latices were determined by spreading the latex on a glass plate and drying in air at room temperature. The dried films were stripped from the plate and some of their properties were determined. The results are given below:

Table 1

| Monomer Composition, Per Cent | | | Film Characteristics |
|---|---|---|---|
| Vinylidene Chloride | Acrylonitrile | Ethyl Acrylate | |
| 85 | 5 | 10 | Crazed, discontinuous film. |
| 85 | 7.5 | 7.5 | Do. |
| 88 | 2 | 10 | Slightly brittle, continuous film. |
| 88 | 4 | 8 | Crazed, discontinuous film. |
| 88 | 6 | 6 | Do. |
| 88 | 8 | 4 | Do. |
| 89 | 2 | 9 | Flexible, continuous film. |
| 90 | 2.5 | 7.5 | Do. |
| 90 | 3 | 7 | Do. |
| 90 | 5 | 5 | Do. |
| 90 | 7.5 | 2.5 | Brittle film. |
| 90 | 10 | 0 | Crazed, brittle film. |
| 91 | 4 | 5 | Flexible, continuous film. |
| 92 | 2 | 6 | Do. |
| 92 | 4 | 4 | Do. |
| 92 | 6 | 2 | Brittle, continuous film. |
| 92 | 8 | 0 | Crazed, discontinuous film. |
| 94 | 3 | 3 | Flexible, continuous film. |
| 95 | 0 | 5 | Crazed, discontinuous film. |
| 95 | 1 | 4 | Flexible, continuous film. |
| 95 | 4 | 1 | Do. |
| 95 | 5 | 0 | Brittle, continuous film. |
| 96 | 2 | 2 | Crazed, discontinuous film. |
| 98 | 1 | 1 | Do. |

The air-dried freshly prepared films of copolymers within the previously defined range of 89 to 92 per cent vinylidene chloride, 2 to 4 per cent acrylonitrile and 4 to 9 per cent ethyl acrylate (with at least 90 per cent vinylidene chloride when the acrylonitrile is 3 per cent and at least 91 per cent vinylidene chloride when the acrylonitrile is 4 per cent) are elastic materials capable of 200 per cent elongation and of 75 to 90 per cent return upon release, while the few flexible, continuous films obtained from copolymers outside of the said composition range have elongation values in the range below 70 per cent and exhibit slight tendency to retract when tension is released. A typical copolymer of the latter class is that of 90 per cent vinylidene chloride and 5 per cent each of acrylonitrile and ethyl acrylate. Another is that of 90 per cent vinylidene chloride and 10 per cent ethyl acrylate. Some of their properties are compared below with those of the copolymer of 90 per cent vinylidene chloride, 3 per cent acrylonitrile and 7 per cent ethyl acrylate.

| Copolymer | Tensile Strength (T) Lbs./sq. in. | Elongation (E) Per Cent | Toughness Factor, T×E÷1000 |
|---|---|---|---|
| 90—3—7 | 2,943 | 273 | 803.4 |
| 90—5—5 | 4,498 | 66 | 296.7 |
| 90—0—10 | 3,869 | 28 | 108.4 |

The copolymer of this invention gives films which are 2.7 times as tough as those from the ternary copolymer containing 5 per cent each of acrylonitrile and ethyl acrylate and 7.4 times as tough as those from the binary copolymer containing 10 per cent of ethyl acrylate. The moisture vapor transmission values of films 1 mil thick afford another basis for comparison. For this test, the films used had been carefully air dried at 40° C. and aged for one week.

| Copolymer | M. V. T. (grams H₂O/100 sq. in./24 hours) |
|---|---|
| 90—3—7 | 0.15-0.19 |
| 90—0—10 | 8-10.0 |

For comparison, the MVT value of a commercial extruded and stretched film of about 90 per cent vinylidene chloride and 10 per cent vinyl chloride 1 mil thick is usually in the range 0.20 to 0.25 grams water per 100 square inches per 24 hours, and such an extruded film 3 mils thick usually has a corresponding value of 0.15 to 0.20 under the test conditions here employed.

An interesting characteristic of the latices of the new copolymers is their ability to deposit films which, when first dried are mainly amorphous and which become submicroscopically crystalline in about a week, as shown by X-ray diffraction patterns. Thus, the freshly dried films of the new polymers show a single broad band on the X-ray pattern, and are clearly amorphous. In one or two days a sharp line begins to appear in the broad band. In another day or two the line is found to be sharper and the band begins to disappear. A picture taken 6 to 10 days after deposition of the film exhibits only the sharp crystal pattern. This is at variance with the usual experience with crystalline polymers, for it has been common belief and experience that the most highly crystalline form of a crystalline polymer is that obtained directly from the polymerization reaction. Such appears to be the case with copolymers of the present constituents outside of the range of the present invention, as no progressive change in crystallinity of behavior is noted in those copolymers comparable to that noted in the new ones. The films of the new copolymers may be deformed, as by deep drawing, while still amorphous, and may then be crystallized while deformed, by heating, to produce dimensionally stable crystalline articles.

EXAMPLE 2

A copolymer of 90 per cent vinylidene chloride, 3 per cent acrylonitrile, and 7 per cent ethyl acrylate was prepared in the form of a latex-like dispersion having 55 per cent solids, in the manner and under the conditions described in the preceding example. The pH of the emulsion was raised from an initial value of 6.0 to a final value of 8.0 by addition of tetrasodium pyrophosphate after polymerization was complete. The latex was stable to mechanical agitation, as shown by the fact that it could be stirred vigorously in the standard Hamilton-Beach stability test for over 3 hours without coagulating or "breaking," either when new or after 6 weeks' storage. A similar stability value was obtained after the latex has been frozen and thawed three times, as well as after heating the latex to 60° C. and cooling to room temperature. It is apparent that the conditions of temperature and agitation encountered in storage and shipment will not affect the latex adversely. This latex was used in two separate mills to coat a two-side mineral coated book paper. Two coats of latex were applied to the paper, the first being air dried for a few minutes before the second was superimposed on it. The total weight of copolymer coating was in the range of 20 to 25 pounds per ream of 3000 square feet. Samples of each batch of coated paper (designated below as "A" and "B") were folded and creased, folded back 360° and creased again, and the process was repeated to produce a crease at right angles to the first. These were tested for moisture vapor transmission at 100° F. with anhydrous calcium chloride on one side of the samples and water-saturated air circulating on the other side. One test was made on freshly prepared samples and the other on samples which had been stored at room temperature for several weeks. The results are given below:

| Sample | M. V. T. (g. water/100 sq. in./24 hours) | |
|---|---|---|
| | New | Aged |
| A—double creased | 0.33 | 0.28 |
| B—double creased | 0.26 | 0.18 |
| A—not creased | 0.177 | 0.155 |

Similarly double creased portions of the coated paper were subjected to the TAPPI greaseproofness test. The samples were placed over white blotting paper, a small pile of fine sand was placed over the crossed crease lines, and a solution of a red dye in turpentine was poured on each pile of sand. An observation was made of the time required for the dyed turpentine to "strike through" the coated paper. Both the fresh and the aged samples showed no failure in 30 minutes. A sample which does not fail in 3 minutes is deemed to be satisfactorily greaseproof.

The films and coatings described in the example were odorless and imparted no taste or odor to foods wrapped in the film or coated paper.

While the outstanding usefulness of the new copolymers arises from the ability of their latices to deposit the described tough, flexible, moisture impervious and greaseproof films and coatings, it is to be understood that their utility is not limited to the production of such films and coatings. Thus, the latex-like dispersions of the new copolymers may be coagulated by the addition of saline electrolytes or they may be used to form coatings by electrodeposition in a manner similar to that used with rubber latex. Similarly, while the new copolymers are capable of forming continuous films or coatings without any plasticizer being present, it is to be understood that they tolerate the addition of plasticizers and, with such modifiers present, form softer, though somewhat weaker films than those described above.

If desired, the normally low viscosity (7 to 10 centipoises) of the herein-described latices may be increased without interfering with their film-forming properties, by the addition of less than 1 per cent, based on the weight of dispersed solids, of such thickeners as hydroxyethyl cellulose, or the sodium salt of carboxymethyl cellulose, or the sodium or ammonium salts of polyacrylic acid. As little as 0.3 per cent of these agents increases the latex viscosity to values above 100 centipoises, and greater or lesser amounts may be used to obtain the viscosity desired for the intended method of coating.

We claim:

The latex-like dispersion of a ternary copolymer obtained by polymerizing together a mixture of 90 per cent vinylidene chloride, 2.5 to 3 per cent acrylonitrile and the balance, from 7.5 to 7 per cent of ethyl acrylate dispersed in water in a ratio of from 45 to 60 per cent of the mixed monomers and correspondingly from 55 to 40 per cent of water, in the presence of an anionic emulsifier and a peroxidic catalyst, at a pH between 1.5 and 6.5 until polymerization is substantially complete, said copolymer latex being capable of depositing flexible and elastic films and coatings which are continuous and highly impervious to moisture when dried at room temperature.

GEORGE WILLIAM STANTON.
CHARLES EVERETT LOWRY.

REFERENCES CITED

The following references are of record in the file of this patent:

UNITED STATES PATENTS

| Number | Name | Date |
|---|---|---|
| 2,278,415 | Arnold | Apr. 7, 1942 |
| 2,404,779 | Arnold | July 30, 1946 |
| 2,404,817 | Strain | July 30, 1946 |